United States Patent
Huapaya et al.

(10) Patent No.: US 11,139,962 B2
(45) Date of Patent: Oct. 5, 2021

(54) METHOD, CHIP, DEVICE AND SYSTEM FOR AUTHENTICATING A SET OF AT LEAST TWO USERS

(71) Applicant: SafeNet, Inc., Belcamp, MD (US)

(72) Inventors: Luis Miguel Huapaya, Gemenos (FR); Luc Astier, Gemenos (FR); Sam Zhanpeng Wang, Gemenos (FR)

(73) Assignee: THALES DIS CPL CANADA, INC., Ottawa (CA)

( * ) Notice: Subject to any disclaimer, the term of this patent is extended or adjusted under 35 U.S.C. 154(b) by 99 days.

(21) Appl. No.: 16/730,722

(22) Filed: Dec. 30, 2019

(65) Prior Publication Data

US 2021/0203657 A1    Jul. 1, 2021

(51) Int. Cl.
*H04L 9/08* (2006.01)
*H04L 29/06* (2006.01)

(52) U.S. Cl.
CPC .......... *H04L 9/085* (2013.01); *H04L 9/0855* (2013.01); *H04L 9/0866* (2013.01); *H04L 9/0872* (2013.01); *H04L 63/0853* (2013.01); *H04L 63/0861* (2013.01); *H04L 63/0869* (2013.01); *H04L 63/0884* (2013.01)

(58) Field of Classification Search
CPC ..... H04L 9/085; H04L 9/0872; H04L 9/0866; H04L 9/0855; H04L 63/0853; H04L 63/0869; H04L 63/0884; H04L 63/086
See application file for complete search history.

(56) References Cited

U.S. PATENT DOCUMENTS

2006/0088166 A1*  4/2006  Karusawa ............ H04L 9/3273
                                                         380/277

2018/0121636 A1*  5/2018  Schiffman ............ G06F 21/34

FOREIGN PATENT DOCUMENTS

| EP | 3029591 A1 | 6/2016 |
| EP | 3316163 A1 | 5/2018 |
| WO | 2019/190522 A1 | 10/2019 |

OTHER PUBLICATIONS

Notification of Transmittal of the International Search Report and the Written Opinion of the International Searching Authority (Forms PCT/ISA/220, PCT/ISA/210, and PCT/ISA/237) dated Mar. 25, 2021, in corresponding International Application No. PCT/US2020/067001. (14 pages).

\* cited by examiner

*Primary Examiner* — Huan V Doan
(74) *Attorney, Agent, or Firm* — Buchanan Ingersoll & Rooney PC

(57) ABSTRACT

A set of users who may authenticate is predefined and is associated, each, with a reference secret share. A first subset of users who has, each, to authenticate is predefined. The device defines a second subset of the users who has, each, to authenticate while further satisfying, each, to be physically proximate to the device and an authentication condition(s). The second user subset is comprised within the first user subset comprised within the user set. The device verifies whether each user of the second user subset satisfies to be physically proximate to the device and the authentication condition(s), if yes, requests, to each user device, the secret share and receives, from each user device relating to at least the first user subset, the secret share. The device reconstructs a secret with each received secret share, verifies whether the reconstructed matches the reference and, if yes, authenticates the user set.

10 Claims, 2 Drawing Sheets

METHOD, CHIP, DEVICE AND SYSTEM FOR AUTHENTICATING A SET OF AT LEAST TWO USERS

FIELD OF THE INVENTION

The invention relates generally to a method for authenticating a set of at least two users to a device.

The device includes, among other computing devices, a Hardware Security Module (or HSM) type device, a server, a terminal, a mobile (tele)phone, a laptop, a Personal Computer (or PC) and a user terminal.

Furthermore, the invention also concerns corresponding chip and first system for authenticating a set of at least two users.

Moreover, the invention pertains to corresponding device and second system for authenticating a set of at least two users as well.

STATE OF THE ART

As known per se, an M (out) of N authentication scheme forces all of M actors, as secret share holders, among a total number N of participants, to be locally present at an HSM location, so as to authenticate to the HSM.

Nevertheless, such a local (presence) M of N authentication scheme is difficult to implement. As a matter of fact, the local M of N authentication scheme requires to gather all of the M actors together at the HSM location in particular when M is greater than two.

Due to such a local presence constraint by involving that one or several users have to travel to the HSM location, the M of N authentication scheme may be implemented by allowing the M actors to be remote from the HSM location.

However, such a remote M of N authentication scheme significantly reduces the security level since the corresponding remote M endpoints are usually arbitrary computers which are unknown to the HSM.

There is a need of an alternative solution that allows authenticating notably the actors of the M of N authentication scheme while being secure and user friendly.

SUMMARY OF THE INVENTION

The invention proposes a solution for satisfying the just herein above specified need by providing a method for authenticating a set of at least two users to a device.

According to the invention, the set of the at least two users who may authenticate is predefined. Each user of the user set is associated with a predefined share of a predetermined reference secret. A first subset of the at least two users who has, each, to authenticate being predefined. The first user subset is comprised within the user set. The method comprises:
- defining, by the device, a second subset of the at least two users who has, each, to authenticate while further satisfying, each, to be physically proximate to the device and at least one predetermined first authentication condition, the second user subset being comprised within the first user subset;
- verifying, by the device, whether each user of the second user subset does or does not satisfy to be physically proximate to the device and the at least one first authentication condition;
- requesting, by the device, to each user device relating to the user set, the associated secret share, only if each user of the second user subset satisfies to be physically proximate to the device and the at least one first authentication condition;
- receiving, by the device, from each user device relating to at least the first user subset, the associated secret share;
- reconstructing, by the device, for the user set, a secret by using each received secret share;
- verifying, by the device, whether the reconstructed secret does or does not match the reference secret; and
- authenticating, by the device, the user set, only if the reconstructed secret matches the reference secret.

The principle of the invention consists in identifying (or defining), by an (authentication) device, among a first user subset to be authenticated, a second user subset for which, for each concerned user, to be proximate to the device and one or several predefined additional (authentication) conditions are further to be fulfilled (or satisfied). The device has previously distributed a secret share to each user of a user set. The device checks whether each user of the second user subset fulfils (or not) to be proximate to the device and the additional condition(s). Only if each user of the second user subset fulfils to be proximate to the device and the additional condition(s), the device requests, each user of the user set, to provide a secret portion, fragment or share. The device gets, as a response(s) to the requests, the secret share of at least each user of the first user subset. Then, the device builds or reconstructs a corresponding whole secret, as a reconstructed secret, by using all of the received secret shares. The device thus compares the reconstructed secret to a predefined reference secret. The device authenticates, only if the reconstructed secret corresponds to the reference secret, at least the first user subset and therefore the user set.

The total number of the user set users who are likely to be authenticated is e.g., N. The number of users who have to be authenticated, as the first user subset, is e.g., M. The number of users who have to be authenticated, as the second user subset, while further fulfilling one or several conditions, is e.g, L. The second user subset is comprised within the first user subset that is itself comprised within the user set. In other words, L is less than or equal to M which is itself less than or equal to N.

Accordingly, the known M of N authentication scheme becomes, thanks to the invention solution, e.g., a further conditional L (out) of M (out) of N authentication scheme.

The invention solution is simpler than the known local presence M of N authentication scheme at the user side, since, depending on the condition(s) to be satisfied, not all of the first user subset users have to be locally present at the device.

The invention solution allows enhancing the user experience, depending on the condition(s) to be satisfied, since not all of the first subset users needs to move or travel to the device location.

The invention solution is more secure than the known remote M of N authentication scheme, since a part or all of the first user subset, namely the second user subset, has to be proximate to the device and additionally satisfy one or several conditions.

The invention solution is secure at the device side, since the device verifies that each user of the second user subset satisfies to be proximate to the device and the additional condition(s) and the device has to authenticate the user(s) of at least the first user subset from her/his/their associated secret share(s).

Advantageously, the first authentication condition(s) may include:

a user device or chip for each user of the second user subset has to be previously registered at the device;

at least one predefined communication protocol for each user of the second user subset has to be used for accessing the device;

a predefined secret share for each user of the second user subset has to be bound to a corresponding user device or chip;

a user device, for each user of the second user subset, has to securely retrieve, from a coupled hardware secure element, the associated secret share;

at least one previous successful user authentication has to be carried out by or through the user device for each user of the second user subset.

Within the present description, a Secure Element (or SE) is a smart object that includes a chip(s) that protect(s), as a tamper resistant component(s), access to stored data and that is intended to communicate data with an external device(s), like e.g., an SE host device, such as a mobile phone or a PC.

According to a further aspect, the invention is a chip for authenticating a set of at least one user.

According to the invention, the set of the at least two users who may authenticate is predefined. Each user of the user set is associated with a predefined share of a predetermined reference secret. A first subset of the at least two users who has, each, to authenticate being predefined. The first user subset is comprised within the user set. The chip is configured to:

define a second subset of the at least two users who has, each, to authenticate while further satisfying, each, to be physically proximate to the device and at least one predetermined first authentication condition, the second user subset being comprised within the first user subset;

verify whether each user of the second user subset does or does not satisfy to be physically proximate to the device and the at least one first authentication condition;

request, to each user device from each user of the user set, the associated secret share, only if each user of the second user subset satisfies to be physically proximate to the device and the at least one first authentication condition;

receive, from each user device relating to at least the first user subset, the associated secret share;

reconstruct, for the user set, a secret by using each received secret share;

verify whether the reconstructed secret does or does not match the reference secret; and authenticate the user set only if the reconstructed secret matches the reference secret.

According to still a further aspect, the invention is a first system for authenticating a set of at least two users. The first system comprises one or several devices and one or several chips. The device(s) is(are) connected or communicatively coupled to the chip(s). The chip(s) include(s) one or several aforementioned chips.

The invention system may include a Terminal Equipment(s) (or TE) including, each, a (mobile) phone, and one or several chips that include the aforementioned chip.

According to still a further aspect, the invention is a device for authenticating a set of at least two users.

According to the invention, the device includes the aforementioned chip.

According to still a further aspect, the invention is a second system for authenticating a set of at least two users. The second system comprises one or several servers and one or several devices. The device(s) is(are) connected to the server(s). The device(s) include(s) one or several aforementioned devices.

BRIEF DESCRIPTION OF THE DRAWINGS

Additional features and advantages of the invention will be apparent from a detailed description of one preferred embodiment of the invention, given as an indicative and non-limitative example, in conjunction with the following drawings.

DETAILED DESCRIPTION

Herein under is considered a case in which the invention method for authenticating a set of at least two users to a device is implemented by, locally at an HSM (type device) side, as an authentication and a standalone device, and a first TE, as a proxy, and a second TE that is remote with respect to the HSM location. The HSM does not cooperate with any SE. The first and the second TE cooperate preferably, each, with an SE chip, so as to increase the security level to carry out the functions that are described infra and that are carried out at the first and second TE sides.

According to another embodiment (not represented), the invention method for authenticating a set of at least two users to a device is implemented by an SE chip and a plurality of user devices, as standalone user devices. According to such an alternative embodiment, the authentication device cooperates with the SE chip that carries out the functions that are described infra and that are carried out by the HSM.

The invention does not impose any constraint as to a kind of the SE type.

Naturally, the herein below described embodiment is only for exemplifying purposes and is not considered to reduce the scope of the invention.

Figure 1:
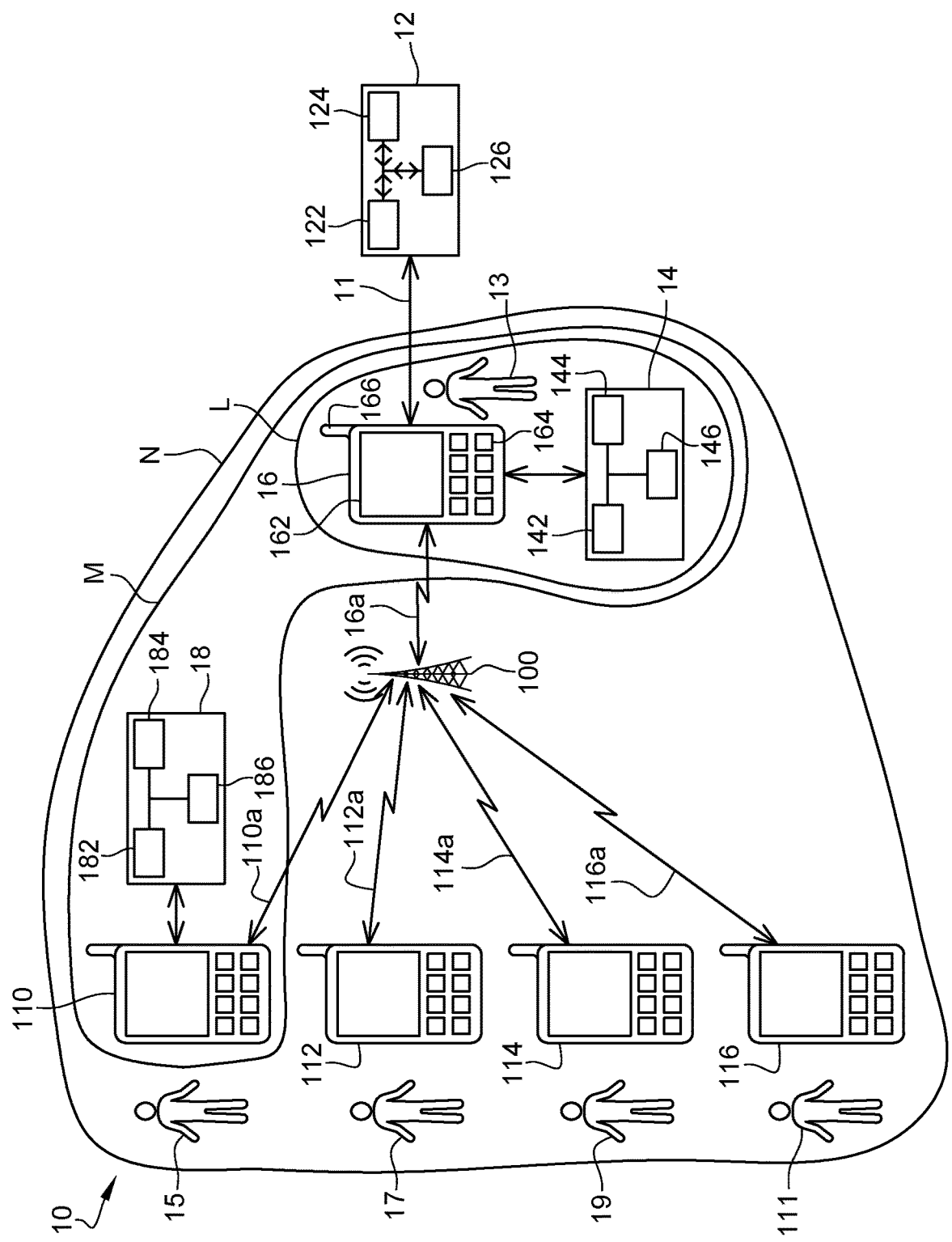
FIG. 1 illustrates an embodiment of a system comprising an HSM, as an authentication device, a first and a second TE, as mandatory participants, and a third, a fourth and a fifth TEs, as optional participants, in which the HSM implements an L of M of N authentication scheme, according to the invention.

FIG. 1 shows schematically a system 10 that includes an HSM 12, five user Terminals (or T) 16, 110, 112, 114 and 116. Each user T 16, 110, 112, 114 or 116 is associated with a corresponding user 13, 15, 17, 19 or 111 respectively.

The HSM 12, as an authentication device, is adapted to carry out, according to the invention, an L (out) of M (out) of N authentication scheme.

Instead of an HSM, the authentication device may include a user terminal, a terminal, a PC, a desktop computer, a mobile phone, a tablet, a laptop (computer), a media-player, a game console, a netbook, a smart watch, a smart jewel (or jewelry), a handset, a Personal Digital Assistance (or PDA) and/or any stationary or mobile (electronic) device. The authentication device may include any other computing device including means for processing data, comprising communication means for exchanging data with outside, and comprising and/or being connected to means for storing data.

Alternately, the authentication device includes a chip (not represented). The chip may be hosted by the authentication device, such as an HSM type device, a server or a terminal, so as to carry out the functions that are carried out by the HSM 12 and that are described below.

To implement the L of M of N authentication scheme, the HSM 12 (or another cooperating entity, such as a server) determines a complete or whole (authentication or cryptographic) reference secret. The reference secret includes a cryptographic key or an authentication token.

According to an essential invention feature, the HSM 12 defines a second subset of e.g., 1, as L, user who has to authenticate and who further has to satisfy to be physically proximate to the HSM 12 and one or several predetermined (authentication) conditions.

The second user subset, as L user subset, is comprised within the M user subset. In other words, the L user subset is a subset of the M user subset.

The L user subset comprises one or several users, as L users.

The relationship between the L user subset, the M user subset and the N user set is as follows: L is less than or equal to M which is itself less than or equal to N.

Each user of the L user subset, among the M user subset, has to authenticate to the HSM 12 and satisfy to be physically proximate to the HSM 12 and an (authentication) condition(s) that is(are) stored in association with each concerned user of the L user subset.

The number L represents the minimum of user(s) who has(have), each, among the M user subset, to satisfy to be physically proximate to the HSM 12 and additionally the (authentication) condition(s).

The reference secret may be valid in a temporary manner, i.e. for a limited time period or a limited number of authentication sessions, like e.g., only once. Thus, after each authentication session, the HSM 12, as the source, and the N users (i.e. their associated registered device(s) or chip(s), as trusted device(s) or chip(s)) are able to change or rotate their secret shares.

The HSM 12 (or another cooperating entity, such as a server) may be able to update, possibly in a time regular manner or, at a request, from at least some users of the N user set, like e.g., the user(s) who belong(s) to either the first subset users who have to authenticate or the second subset user(s) who has(have) to further satisfy to be physically proximate to the HSM 12 and one or several conditions.

The HSM 12 (or another cooperating entity, such as a server) separates or divides the reference secret into a number of secret shares that equals to a number of users of a user set, namely N.

Each user of the N user set is provided, through his/her user device or chip, with a corresponding secret share that is thus individually and respectively distributed. The N secret shares are preferably separate from each other and are, each, associated with a separate user.

The HSM 12 may authenticate a set of e.g., 5, as N, users, while authenticating, in a mandatory manner, a first user subset of e.g., 2, as M, users. The first user subset of M users is comprised in the user set of N users.

The HSM 12 includes one or several (micro)processors (and/or a (micro)controller(s)) 122, as data processing means, comprising and/or being connected to one or several memories 124, as data storing means, comprising or being connected to means for interfacing with a user, such as a Man Machine Interface (or MMI), and comprising an Input/Output (or I/O) interface(s) 126 that are internally all connected, through an internal bidirectional data bus.

The I/O interface(s) 126 may include a wire and/or a wireless interface(s), to exchange, over a ContacT (or CT) and/or ContacT-Less (or CTL) link(s) 11 respectively, with a user terminal or chip, as an external interlocutor entity(ies).

Within the present description, the adjective "CTL" denotes notably that the communication means communicates via one or several Short Range (or SR) type Radio-Frequency (or RF) links.

The SR type RF link(s) may be related to any CTL technology that allows the HSM 12 to exchange locally data, through a CTL type link(s) 11, with the external interlocutor entity(ies), as a proximate interlocutor entity(ies).

The CTL link(s) 11, when present, may include a BluetooTH (or BTH), a Bluetooth Low Energy (or BLE), a Wi-Fi, a ZigBee, a Near Field Communication (or NFC) type link(s) and/or any other SR type RF communication technology link(s).

Alternatively, instead of a CTL link(s), or additionally, the HSM 12 is connected, through a wire(s) and/or a cable(s) (not represented), via a CT link(s), to the external interlocutor entity(ies), as a proximate interlocutor entity(ies). The CT link(s) may include a USB (acronym for "Universal Serial Bus") type cable(s).

Such a CT and/or CTL link(s) 11 to the HSM 12 imply(ies) that an HSM interlocutor(s), such as a T, be present at the HSM 12 location.

The HSM 12 MMI may include a display screen(s) (not represented), a keyboard(s) (not represented), a loudspeaker(s) (not represented), a microphone(s), a camera(s) and/or (an)other interface(s) (not represented). The HSM 12 MMI allows a user(s) to interact with the HSM 12. The HSM 12 MMI may be used for inputting data to be stored in or through the HSM 12, or for outputting data, such as a secret share(s), that is(are) securely stored in either the HSM 12 or an entity cooperating with the HSM 12, such as an SE(s) (not represented).

The HSM memory(ies) 124 may include one or several volatile memories and/or one or several non-volatile memories.

The HSM memory(ies) 124 may store data, such as an IDentifier(s) (or ID(s)) relating to the HSM 12, that allows identifying uniquely and addressing the HSM 12. The HSM ID(s) may include a unique ID 1, such as a Unique Universal ID (or UUID) UUID 1, a Uniform Resource Locator (or URL) URL1, a Uniform Resource ID (or URI) URI1, and/or other data that allows identifying uniquely and addressing the HSM 12.

The HSM memory(ies) 124 stores preferably a first and/or a last name(s), as a user ID(s), relating to each user who may authenticate to the HSM 12, as a user belonging to the user set N.

The HSM memory(ies) 124 stores preferably an International Mobile Equipment Identity (or IMEI), a Mobile Subscriber Integrated Services Digital Network number (or MSISDN), an Internet Protocol (or IP) address, a Media Access Control (or MAC) address, an email address(es), an International Mobile Subscriber Identity (or IMSI), an Integrated Circuit Card IDentifier (or ICCID) and/or the like, as a unique ID(s) relating to a device and/or a chip that is(are) bound to each user who may or has to authenticate to the HSM 12 and possibly further satisfy to be physically proximate to the HSM 12 and a preregistered condition(s) and who belongs to the 5 users, as the user set, the 2 users, as the first user subset, the 1 user, as the second user subset respectively.

The HSM 12 thus registers preferably one or several IDs relating to the user device and/or chip relating to each user relating to at least the second user subset, the first user subset or the user set. The registered user device(s) and/or chip(s), as trusted device(s) and/or chip(s), allow(s) to know how to communicate with each of the device(s) and/or chip(s).

The HSM 12 may have previously generated the reference secret by using a predetermined algorithm, such as a pseudo-random generator, with a predefined input(s), like e.g., data relating to a time of a corresponding reference secret generation.

The HSM memory(ies) 124 stores preferably, in a secure manner, the reference secret.

Alternately, the HSM 12 has received preferably in a secure manner the reference secret from a cooperating entity, such as an SE (not represented) that is connected or communicatively coupled to the HSM 12 or a (remote) server (not represented) that is connected to the HSM 12. Such an entity that cooperates with the HSM 12 has previously generated the reference secret.

The SE may include an incorporated chip, like e.g., an embedded Universal Integrated Circuit Card (or eUICC), an integrated Universal Integrated Circuit Card (or iUICC) or a Trusted Execution Environment (or TEE), as a secure area of the (host device) processor and a secured runtime environment, within an SE host device, or a chip that is communicatively coupled to the SE host device, and included in a smart card or another medium, such as a USB dongle. The chip may be fixed to or removable from its host device. As removable SE, it may be a Subscriber Identity Module (or SIM) type card, a Secure Removable Module (or SRM), a smart dongle of the USB type, a (micro-) Secure Digital (or SD) type card or any format card to be coupled to the host device. The invention does not impose any constraint as to a kind of the SE type.

The HSM 12 is preferably arranged to split or divide the reference secret into as many shares, namely N, as there are users who may authenticate to the HSM 12 and who are comprised in the N user set.

The HSM 12 carries out preferably one or several security functions.

The security function(s) include(s) preferably a data encryption process, by using, as a sender of data, such as e.g., a public key relating to the user device and/or chip, as an HSM interlocutor, so as to generate encrypted data, prior to its secure sending (i.e. in a protected manner), to the HSM interlocutor.

The security function(s) include(s) preferably a data encryption process, by using, as a sender of data, such as e.g., a (symmetric) key shared with a user device and/or chip, as an HSM interlocutor, so as to generate encrypted data, prior to its secure sending (i.e. in a protected manner), to the HSM interlocutor. The shared key is preferably derived from the secret share associated with the concerned user. The HSM interlocutor is, besides the HSM 12, the sole device that is able to decrypt the encrypted data if the HSM interlocutor has the concerned secret share and therefore the corresponding shared key.

The security function(s) include(s) preferably a data decryption process by using a private key related to the HSM 12, so as to decrypt data that is received in an encrypted manner, after its receipt from the HSM interlocutor.

The security function(s) include(s) preferably a data decryption process, by using, as a receiver of data, such as e.g., a (symmetric) key shared with an HSM interlocutor. The shared key is preferably derived from the secret share associated with the concerned user. The HSM 12 is, besides the HSM interlocutor, the sole device that is able to decrypt the encrypted data if the HSM interlocutor has the concerned secret share and therefore the corresponding shared key.

The HSM memory(ies) 124 stores, in association with each user device and/or chip ID(s), a corresponding secret share for each user of the N user set.

The HSM 12 registers in association:
for a first user 13, a secret 1, as a first secret share, and an ID relating to the T1 16 and preferably in association with an ID relating to the SE1 14;
for a second user 15, a secret 2, as a second secret share, and an ID relating to the T2 110 and preferably in association with an ID relating to the SE2 18;
for a third user 17, a secret 3, as a third secret share, and an ID relating to the T3 112 and preferably in association with an ID relating to the SE3;
for a fourth user 19, a secret 4, as a fourth secret share, and an ID relating to the T4 114 and preferably in association with an ID relating to the SE4; and
for a fifth user 111, a secret 5, as a fifth secret share, and an ID relating to the T5 116 and preferably in association with an ID relating to the SE5.

The 5 users, as an N user set, who may authenticate to the HSM 12 is preferably preregistered, i.e. predefined, at the HSM 12. Each user of the N user set is further associated with a share of the reference secret, namely a user n is associated with a secret n.

Each user of the N user set may be associated with a user role. The user role may include, as a specific user role(s), e.g., a (key) ceremony administrator, a system administrator, a witness, a cryptographic officer and/or (an)other specific user role(s) which may depend on the concerned ceremony or act or the like.

Each user role may be associated with rights as well. The rights allows defining one or several resources which the concerned user, possibly for the specific (user) role, when successfully authenticated, has access to.

A first subset of 2 users, as an M user subset, who is(are), each, preregistered at the HSM 12, as a user belonging to the first subset. The number M represents a quorum or a minimum number of user(s) who has(have), each, to authenticate to the HSM 12 on behalf of the N user set, i.e. instead of all the N users.

A second subset of 1 user, as an L user subset, who is(are), each, preregistered at the HSM 12, as a user belonging to the second subset, with, in association, one or several preregistered authentication conditions to be fulfilled or satisfied including the condition to be physically proximate to the HSM 12. The number L represents a minimum number of user(s) who has(have), each, to authenticate to the HSM 12 and to satisfy to be physically proximate to the HSM 12 and one or several associated and stored authentication condition(s).

The HSM memory(ies) 124 stores an Operating System (or OS).

The HSM memory(ies) 124 stores an invention application for authenticating a set of one or several users, as N user set.

The HSM 12 allows managing a storage of secret shares, per user device, per user chip, possibly per user role, and/or per (thus protected) resource.

The HSM memory(ies) 124 stores the condition(s) to be satisfied by each user of the L user subset. The condition(s)

is(are) preferably associated, for each user, with the concerned associated user device or chip.

The HSM 12 is arranged to define the L user subset of a user(s) who has(have), each, to authenticate while further satisfying, each, to be physically proximate to the HSM 12 and one or several first authentication conditions that are stored or registered preferably in association with the concerned user TE or chip.

The HSM 12 is adapted to verify whether each user of the L (or M) user subset does or does not satisfy to be physically proximate to the HSM 12 and the first condition(s).

The HSM 12 is configured to request, to each preregistered user TE relating to the 5 user set, from each corresponding user, the associated secret share, only if each user of the 2 user subset satisfies to be physically proximate to the HSM 12 and the first condition(s).

The HSM 12 is arranged to receive, from each user device relating to at least the 2 user subset, the associated secret share, as an individual response to the request.

The HSM 12 is configured to rebuild or reconstruct, for the 5 user set, a whole or complete secret by using each received secret share. To reconstruct the complete secret, the HSM 12 either assembles or concatenates the received secret shares preferably in a predetermined (i.e. stored) order. The order may be constituted by firstly the secret share(s) relating to the second user subset, secondly the secret share(s) relating to other user(s) who belong(s) to the first user subset without belonging to the second user subset, and thirdly the secret share(s) relating to other user(s) who belong(s) to the user set without belonging to neither the second user subset nor the first user subset. According to another embodiment, to reconstruct the complete secret, the HSM 12 either assembles or concatenates the received secret shares without using any preregistered order.

The HSM 12 is adapted to verify whether the reconstructed secret does or does not match the reference secret.

The HSM 12 is arranged to authenticate the 5 user set only if the reconstructed secret matches the reference secret.

Each user 13, 15, 17, 19 or 111 is equipped with an associated (mobile) phone 16, 110, 112, 114 or 116, as a user device T1, T2, T3, T4 or T5 respectively, that is used by the concerned user to authenticate to the HSM 12.

Instead of a phone, the user device may include a PC, a tablet, a desktop computer, a laptop computer, a media-player, a game console, a tablet, a netbook, a smart watch, a smart jewel (or jewelry), a handset and/or a PDA that incorporates or cooperates with a baseband (radio) processor(s). The user device may be any other device, like e.g., a terminal, including one or several (micro) processor(s), as means for processing data, an I/O interface(s) for exchanging data with outside, and comprising or being connected to means for storing data.

Each phone 16, 110, 112, 114 or 116 may include, as MMI, a display screen 162 and/or a keyboard 164, a loudspeaker(s) (not represented) and/or a camera(s) (not represented).

The phone MMI allows each associated user to interact with the concerned phone.

The phone MMI may be used for presenting information to its associated user, like e.g., a message(s) for prompting the user to enter or provide user authentication data, such as "Please enter your password", "Please enter your PIN" and/or "Please enter your biometric data".

The phone MMI is preferably used for getting data entered or provided by the concerned user, such as user authentication data, like e.g., a password, a PIN and/or user biometric data (like e.g., a fingerprint(s), a facial print(s), a voice print(s) and/or an iris print(s)).

A phone 16, 110, 112, 114 or 116 memory(ies) store(s) stores an OS and preferably an invention application for provisioning the HSM 12 with an associated secret share.

The secret share may have been previously provided to the concerned user, through a mail, a Short Message Service (or SMS) type message or a message through another out-of-band channel with respect to a channel that is used for transmitting, after preferably a previous user authentication(s), the secret share to be submitted to the HSM 12.

Alternately, instead of the concerned phone, a cooperating SE chip stores or supports the invention application for provisioning the HSM 12 with an associated secret share, preferably in a non-volatile memory.

The phone I/O interfaces relating to each phone are connected to a first antenna (not represented). The first antenna allows exchanging data in a CTL manner with an external interlocutor, such as through the CTL link 11 with the HSM 12.

The phone I/O interfaces relating to each phone are connected to a second antenna 166. Each second antenna 166 allows exchanging data, via a communication network(s) 100, in a wireless manner with an external interlocutor, such as through the wireless link 16a and a wireless link 110a, 112a, 114a, 116a, with another phone 110, 112, 114 or 116.

The second antenna allows the concerned phone to exchange, through a Long Range (or LR) Radio-Frequency (or RF) link(s), as a wireless link(s), via the communication network(s), data notably with an external interlocutor, such as another phone 110, 112, 114 or 116.

The LR RF may be fixed at several hundreds of MHz, e.g., around 850, 900, 1800, 1900 and/or 2100 MHz, as an LR type RF(s).

Additionally or alternately, the communication network(s) may include a WLAN (acronym for "Wireless Local Area Network"), an Internet and/or Intranet type network(s). Such a communication network(s) may be accessed, from the first phone 16, through an SR radio-communication link(s), like e.g., a BTH, BLE, Wi-Fi, Zig-Bee, NFC type link(s), as a CTL link(s).

Alternately or additionally to the LR type RF(s), the phone 16 is connected to or includes CTL communication means for exchanging data with outside, like e.g., via a Wi-Fi Hotspot (not represented), as a Network Access Point (or NAP), to the HSM 12.

The communication network(s) may include a mobile radio-communication network(s), like e.g., a Global System for Mobile Communications (or GSM), a General Packet Radio Service (or GPRS), a Universal Mobile Telecommunications System (or UMTS), an EDGE (acronym for "Enhanced Data rates for GSM Evolution"), a Code Division Multiple Access (or CDMA) and/or a Long Term Evolution (or LTE) type network(s). Such a mobile radio-communication network set is not exhaustive but only for exemplifying purposes.

The phone memory(ies) relating to each phone 16, 110, 112, 114 or 116 may include one or several EEPROMs (acronym for "Electrically Erasable Programmable Read-Only Memory"), one or several ROMs (acronym for "Read Only Memory"), one or several Flash memories, and/or any other memories of different types, like e.g., one or several RAMs (acronym for "Random Access Memory").

The phone memory(ies) relating to each phone 16, 110, 112, 114 or 116 may include one or several volatile memories and one or several non-volatile memories.

The phone memory(ies) relating to each phone 16, 110, 112, 114 or 116 may store a first and/or a last name(s) relating to the concerned user 13, 15, 17, 19 or 111, as a user ID(s), a IMEI, an MSISDN, an IP address, an email address(es) and/or the like, as an ID(s) relating to the concerned phone.

Alternately, a chip (not represented) that is connected or communicatively coupled to the phone stores at least a part of the concerned user ID(s) and/or at least a part of the phone ID(s).

Each phone 16, 110, 112, 114 or 116 or an SE chip cooperating possibly with the concerned phone store(s), in its memory(ies) preferably in a secure manner, reference authentication data, such as a reference password, a reference Personal Identification Number (or PIN) and/or reference biometric data (like e.g., a reference fingerprint(s), a reference facial print(s), a reference voice print(s) and/or a reference iris print(s)), so as to authenticate the concerned user 13, 15, 17, 19 or 111.

Each phone 16, 110, 112, 114 or 116 or the cooperating SE chip store(s) preferably an ID relating to the HSM 12. The HSM ID, such as a URL 1 or a URI 1, allows identifying uniquely and addressing the HSM 12.

Each phone 16, 110, 112, 114 or 116 may include or be connected or communicatively coupled to one or several chips (not represented for all the phones).

The chip(s) may be incorporated, possibly in a removable manner, within a Printed Circuit Board (or PCB) of the host phone 16, 110, 112, 114 or 116, as a chip host device.

The chip(s) may also incorporate at least part of the phone component(s), like e.g., a baseband processor, an application processor(s) and/or other electronic component(s).

In a particular embodiment, the SE chip(s) include(s) a TEE, as a secure area of a phone (or host device) processor and a secured runtime environment.

Alternately, the SE chip(s) may be included in or removable from one or several phones, as SE host device(s).

The SE(s) belong(s) preferably to the concerned user, possibly as a subscriber to a wireless service(s).

The (or each) SE includes one or several chip(s).

The (SE chip) medium may include, instead of a host phone 16, 110, 112, 114 or 116, a watch, a headset or the like, as an accessory of the concerned phone that is able to exchange with the concerned phone. The medium may include any other wearable device, like e.g., a camera, a clothing, a jewel (or jewelry) of the concerned (phone) user or anything that may accommodate or integrate the SE chip(s), which the concerned user wears or accesses.

The T cooperates preferably with an SE chip at least for the second subset of user(s) who has(have), each, to satisfy to be physically proximate to the HSM 12 and one or several additional (authentication) conditions, in addition to a provision of his/her secret share to the HSM 12.

Each SE chip 14 or 18 includes a (micro)processor(s) (and/or a (micro)controller(s)) 142 or 182, as means for processing data, an I/O interface(s) 144 or 184 for exchanging data with outside, and comprising or being connected to a memory(ies) 146 or 186, means for storing data.

Each SE chip 14 or 18 stores an OS and an application for authenticating the concerned user to the HSM 12.

Thus, the first user 13 has the T1 16, as the first device, which is connected or communicatively coupled to the SE1 14 (chip), as a first SE.

The SE1 14 stores preferably, in a secure manner, a secret 1, as a first secret share.

To access the secret 1, the first user 13 has previously to authenticate to the SE1 14. To authenticate to the SE1 14, the first user 13 has to provide a password, a PIN, and/or first user biometric data, as reference authentication data that is stored securely within the SE1 14. The reference authentication data is preferably separate from other reference authentication data that is used for example to access the SE1.

The reference authentication data is preferably dedicated to the access to the secret 1.

The second user 15 has the T2 110, as the second device, which is connected or communicatively coupled to the SE2 18 (chip), as a second SE.

The SE2 18 stores a secret 2, as a second secret share. The SE2 18 stores preferably, in a secure manner, a secret 2, as a second secret share.

To access the secret 2, the second user 15 has firstly to authenticate to the SE2 18.

The third user 17, the fourth user 19 and the fifth user 111 have, each, the T3 112, as the third device, the T4 114, as the fourth device, and the T5 116, as the fifth device respectively.

The third user 17, the fourth user 19 and the fifth user 111 access, each, a secret 3, as a third secret share, a secret 4, as a fourth secret share, and a secret 5, as a fifth secret share respectively.

The T3 112, the T4 114 and the T5 116 store or let, each, another entity cooperating with the concerned user device, store preferably, in a secure manner, the secret 3, the secret 4 and the secret 5 respectively.

To access the secret 3, the secret 4 and the secret 5, the third user 17, the fourth user 19 and the fifth user 111 have, each, firstly to authenticate to the T3 112, the T4 114, the T5 116 or a corresponding cooperating entity, such as an SE, respectively.

Figure 2:
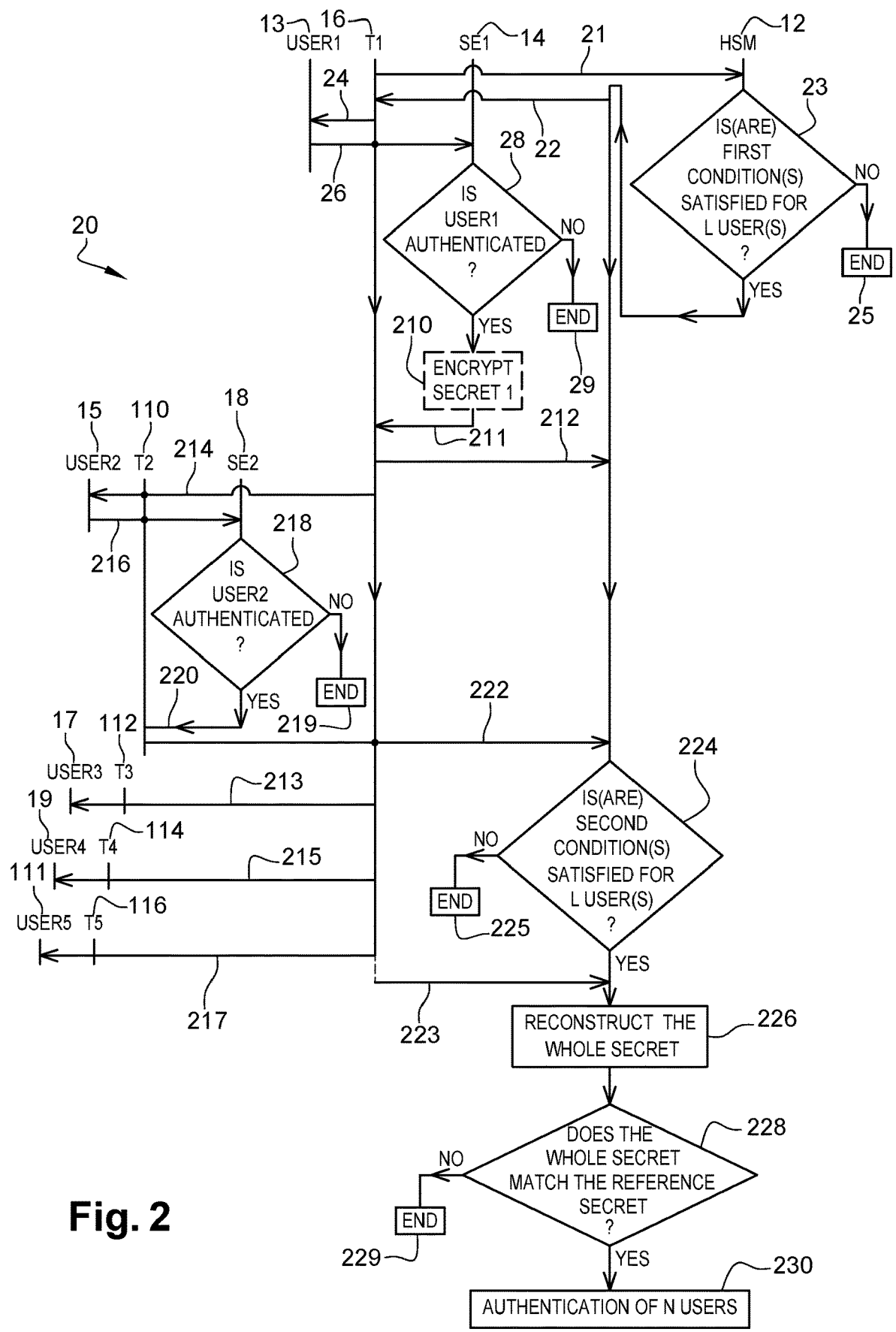
FIG. 2 is an embodiment of a message flow between the HSM and the TEs of FIG. 1, in which the HSM checks whether only the first TE user satisfies to be proximate to the HSM and a predefined additional condition(s), if yes, gets, through the first TE, from at least the first and second TE users, the associated secret shares, reconstructs a (whole) secret, checks whether the reconstructed secret matches a predefined reference secret, and, if yes, authenticates the TE users.

FIG. 2 depicts an exemplary embodiment of a message flow 20 that involves at least the first subset user(s), the HSM 12, as an authentication device, and the chip 14, as a user 13 chip to be at least physically proximate to the HSM 12, so as to authenticate the set users.

In the described example, it is assumed that the HSM 12 stores or accesses, in a corresponding user account:

for the first user 13, as a user of the second subset, an ID(s) relating to her/his T1 16 and her/his SE1 14, the secret 1, to be physically proximate to the HSM 12 and the associated authentication condition(s);

for the second user 15, as a user of the first subset, an ID(s) relating to her/his T2 110 and her/his SE2 18, the secret 2;

for the third user 17, as a user of the set, an ID(s) relating to her/his T3 112, the secret 3;

for the fourth user 19, as another user of the set, an ID(s) relating to her/his T4 114, the secret 4; and for the fifth user 111, as another user of the set, an ID(s) relating to her/his T5 115, the secret 5.

Each user 13, 15, 17, 19 or 111 of at least the first user subset and possibly the user set is bound to a corresponding user device and/or a corresponding user chip.

The HSM 12 thus registers one or several IDs relating to the user device and/or the user chip relating to each user of at least the first user subset and possibly the user set.

The HSM 12 knows that 5 (or N) users may authenticate. To authenticate to the HSM 12, each concerned user may therefore provide a respective secret share.

A first subset, as a 2 (or M) user subset, of two users, namely the first user 13 and the second user 15, who have, each, to authenticate to the HSM 12, are, each, identified and stored, as belonging to the first subset, at the HSM 12. The 2 user subset includes the first user 13 and the second user

15, as 2 users, who both have to be authenticated by the HSM 12 by using their respective secret 1 and secret 2.

A second subset, as a 1 (or L) user subset, of a single user, namely the first user 13, who has to authenticate to the HSM 12, is identified, i.e. defined, and stored, as belonging to the second subset, at the HSM 12. The 1 user subset includes only the first user 13 who has to satisfy to be physically proximate to the HSM 12 and (an)other preregistered authentication condition(s) and who has to be authenticated by the HSM 12.

The HSM 12 stores or accesses a predetermined reference secret to be matched, so as to authenticate the 5 user set.

It is further assumed that the first user 13 has firstly paired her/his T1 16 with the HSM 12 by using e.g., a BTH link, as a CTL link, during a pairing session, while being sufficiently close to the HSM 12.

During the pairing session, the T1 16 and the HSM 12 have negotiated a shared key that the T1 16 and the HSM 12 both store. The T1 16 and the HSM 12 use both the shared key to encrypt or decrypt data to be securely exchanged between the T1 16 and the HSM 12.

Once paired with the HSM 12, the first user 13 e.g. launches a (web) browser supported by the phone 16.

Then, the T1 16, and more exactly its browser, sends 21, preferably through an open secure channel (by using e.g. the shared key), to the HSM 12, a request for launching an execution of the invention application for authenticating 5 users. The (invention application execution) launching request includes or is accompanied with at least T1 16 ID and/or the SE1 14 ID and an Application ID (or AID) relating to the invention application to be launched.

The HSM 12, after a possible decryption of the received data (by using e.g., the shared key), executes, based on the received launching request (and possibly the accompanied data), the requested invention application for authenticating 5 users.

The HSM 12 launches thus an authentication session for authenticating 5 users.

Then, the HSM 12 verifies 23 whether each user of the second subset, namely the first user 13, does or does not satisfy to be physically proximate to the HSM 12 and the (stored) first authentication condition(s) associated with the concerned user.

The first authentication condition(s) may include one or several elements of a group including:
- a user T, as a user device, and/or a user chip for each user of the L user subset, has to be previously registered at the HSM 12. Each user device and/or user chip being preregistered at the HSM 12, a network that includes a trusted user device(s) and/or chip(s) is thus created at the HSM 12. Thus, only the preregistered (identified) user device(s) and/or chip(s) has(have) to be used, by each user of the L user subset, for authenticating to the HSM 12;
- one or several predefined communication protocols, such as a wire, like e.g., a USB type cable and/or a CTL protocol(s), a Wi-Fi, an NFC, a BTH and/or a BLE type protocol(s), for each user of the L user subset, has to be used for accessing the HSM 12;
- each user of the L user subset has to be locally present at the HSM 12;
- a predefined secret share, for each user of the L user subset, has to be bound to a corresponding user device or chip;
- a T, as a user device, for each user of the L user subset, has to securely retrieve, from a coupled HardWare (or HW) SE, the associated secret share;
- one or several previous successful user authentications have to be carried out by or through the user device for each user of the L user subset.

If the first user 13 does not satisfy to be physically proximate to the HSM 12 and/or the (registered) first authentication condition(s), then the HSM 12 terminates or closes 25 the launched authentication session.

In the explained example scenario, the first user 13 is at least locally present at the HSM 12, i.e. within about ten meters with respect to the HSM 12, i.e. physically proximate to the HSM 12 with her/his T1 16 and her/his SE1 14 at hand.

Otherwise, i.e. only if the first user 13 satisfies to be physically proximate to the HSM 12 and the first authentication condition(s), the HSM 12 sends, preferably through the open secure channel, to the T1 16, a request 22, to each preregistered user device relating to the user set, the associated secret share.

Such a request 22 may include or be accompanied with one or several second authentication conditions to be satisfied.

The second authentication condition(s) may include one or several elements of a group including:
- for at least one identified user device to be addressed by the T1 16, a request for encrypting the associated secret share;
- for at least one identified user device to be addressed by the T1 16, a request for signing the associated secret share;
- for at least one identified user device to be addressed by the T1 16, a request for sending, through a single identified user device, as a proxy, the associated secret share.

It is to be noted that, prior to receiving one or several IDs for each preregistered user device (and/or chip) relating to the user set, the T1 16 does not know the thus associated identified user devices (and/or chip(s)) that relate to the user set and which are to be addressed, so as to get the secret shares associated with the involved user devices. Only the HSM 12, as the source, knows who every user device or chip is.

The T1 16 requests 24, through e.g. the phone display screen, the first user 13 to get her/his associated secret share.

The first user 13 sends, through the T1 16, to the SE1 14, a request 26 for getting or releasing the secret 1, as the first secret share.

Such a secret share request 16 includes or is accompanied with preferably submitted first user authentication data, such as a password, a PIN and/or user biometric data.

The SE1 14 verifies 28 whether the SE1 14 does or does not authenticate the first user 13, as user 1.

To authenticate the user 1, the SE1 14 compares the submitted first user authentication data to first (stored) reference user authentication data.

If the submitted first user authentication data does not match first reference user authentication data, then the SE1 14 does not release the requested secret share and terminates or closes 29 the user authentication session.

Otherwise, i.e. only if the SE1 14 authenticates the first user 13, as user 1, the SE1 14 releases or retrieves the requested secret share, namely the secret 1.

In a preferred manner, the SE1 encrypts 210 the secret 1, as the retrieved secret share that is associated with the user 1 (who is preferably previously authenticated), by using a key. Such a key is shared with the HSM 12. Such a key is preferably derived from the concerned secret share, namely the secret 1, associated with the concerned user 1.

The SE1 14 sends, to the T1 16, the retrieved secret 1, as the first secret share 211, preferably in an encrypted manner.

Then, the T1 16 sends, to the HSM 12, as a first response to the request 22, the retrieved first secret share 212, preferably in an encrypted manner.

The T1 16 identifies, based on the received request 22 possibly with the accompanied data, each T relating to a user to be solicited or involved, namely the T2 110, the T3 112, the T4 114 and the T5 116, for instance with their respective MSISDNs, so as to get, while involving their associated users, their respective secret shares.

The T1 16 used by the first user 13, as the proxy user, has preferably to exchange with the second user 15, the third user 17, the fourth user 19 and the fifth user 11, as each other user of at least the first user subset or the user set, as an interlocutor user, by using a live communication, such as a facetime video, between the proxy user and the interlocutor user.

The T1 16, as a proxy, sends, via e.g., one or several communication networks, through the T2 110 (that identified in the request 22 (or data accompanying the request 22), to the second user 15, a request 214 for getting or releasing an associated secret share. Such a secret share request 214 may include or be accompanied with a predetermined additional authentication condition(s). The additional authentication condition(s) is(are) the one(s) that is(are) received from the HSM 12 in the request 22 (or data accompanying the request 22) in association with the identified user device for the concerned associated user.

In the given scenario example, there is only one user, namely the first user 13, that is comprised within the second user subset and that is associated with a single user device, namely T1 16, that plays the role of a proxy user.

To send the secret share request 214, the first user 13 does not move and is still close to the HSM 12.

The T2 110 requests, through e.g. the phone display screen, the second user 15 to get her/his associated secret share.

The second user 15 sends, through the T2 110, to the SE2 18, a request 216 for getting or releasing the secret 2, as the second secret share.

Such a secret share request 216 includes or is accompanied with preferably submitted second user authentication data.

The SE2 18 verifies 218 whether the SE2 18 does or does not authenticate the second user 15, as user 2.

To authenticate the user 2, the SE2 18 compares the submitted second user authentication data to second (stored) reference user authentication data.

If the submitted second user authentication data does not match the second reference user authentication data, i.e. the SE2 18 does not authenticate the second user 15, as user 2, then the SE2 18 does not release the requested secret share and terminates or closes 219 the user authentication session.

Otherwise, i.e. only if the submitted second user authentication data matches the second reference user authentication data (i.e. the SE2 18 authenticates the second user 15, as user 2), the SE2 18 releases or retrieves the requested secret share, namely the secret 2.

In a preferred manner, the SE2 18 encrypts (not represented) the secret 2, as the retrieved secret share that is associated with the user 2 (who is preferably previously authenticated), by using a key. Such a key is shared with the HSM 12 and is preferably derived from the concerned secret share associated with the concerned user 2.

The SE2 18 sends, to the T2 110, the retrieved secret 2, as the second secret share 220, preferably in an encrypted manner.

Then, the T2 110 sends, through the T1 16, to the HSM 12, the retrieved second secret share 222, preferably in an encrypted manner. The user devices or chips, as trusted devices of chips, relating to the M minus one (or M−1) user(s) thus connect(s) locally, through the trusted proxy, their trusted devices or chips to the HSM 12.

The T1 16, as a proxy, sends, via e.g., one or several communication networks, through the T3 112, the T4 114 and the T5 116 (that identified in the request 22 (or data accompanying the request 22), to the third user 17, the fourth user 19 and the fifth user 111, a request 213, 215 and 217 for getting or releasing an associated secret share respectively. Such a secret share request 213, 215 or 217 may include or be accompanied with a predetermined additional authentication condition(s). The additional authentication condition(s) is(are) the one(s) that is(are) received, from the HSM 12, in the request 22 (or data accompanying the request 22) in association with the identified user device for the concerned associated user.

Each of the T3 112, the T4 114 and the T5 116 may send, to the T1 16, as proxy, the associated secret share (not represented).

Alternately, i.e. instead of sending to the HSM 12 each secret share that the T1 16 has just received, the T1 16 waits, for a predetermined time period, to collect at least one requested secret share.

Once the time period has elapsed, when applicable, the T1 16, as the proxy, sends, to the HSM 12, after a preferable encryption (by using the pairing key), all of the collected or received secret shares including at least the secret 1 and the secret 2 (and other secret shares 223).

The T1 16 may send, to the HSM 12, after a preferable encryption (by using the pairing key), all of the collected or received secret shares including at least the secret 1 and the secret 2.

It is to be noted that, when the secret share that originates from any user device that is different from the T1 16, the T1 16 is unable to access the concerned secret share when this secret share is encrypted by using a key shared between the source user device or chip and the HSM 12. The proxy, namely the T1 16, is therefore unable to act like a man in the middle.

The HSM 12 receives, preferably through the T1 16, as the proxy, the secret 1, possibly after a double decryption (by using e.g. the pairing key and the shared key derived from the secret 1), and at least the secret 2, possibly after a double decryption (by using e.g. the pairing key and the shared key derived from the secret 2), from the T2 110 (that is associated with a user that belongs to the first user subset).

The HSM 12 may also receive, preferably through the T1 16, as the proxy, (an)other secret share(s), possibly after a decryption(s) by using e.g. a key(s) derived from the concerned secret share(s), from the T3 112, T4 114 and/or the T5 116 (that are, each, associated with a user that belongs to the user set but does not belong to the first user subset).

The HSM 12 may verify 224, based on received data, namely the received secret shares and possibly data accompanying the received secret shares, whether a user of the second user subset does or does not satisfy a predetermined (i.e. preregistered) third authentication condition(s).

The third authentication condition(s) may include one or several elements of a group including:

the T1 16, as a user device relating to the second user subset, has to be used, as a proxy, for exchanging with the HSM 12;

the proxy has to exchange with each other user of at least the first user subset, as an interlocutor user, by using a live communication between the proxy user and the interlocutor user;

the proxy user has to identify each other user of at least the first user subset, as an interlocutor user;

the proxy user has to authenticate each other user of at least the first user subset, as an interlocutor user.

If the first user 13 does not satisfy the (registered) third authentication condition(s), then the HSM 12 terminates or closes 225 the launched authentication session.

Otherwise, i.e. only if the first user 13 satisfies the third authentication condition(s), the HSM 12 continues the authentication process.

Only if the third authentication condition(s) is(are) satisfied, when applicable, the HSM 12 reconstructs 226, for the user set, a (whole) secret by using each received secret share. Each received secret share allows proving an approval of its associated user.

The HSM 12 verifies 228 whether the reconstructed secret does or does not match the reference secret.

If the reconstructed secret does not match the reference secret, then the HSM 12 fails to authenticate the five users, as the N user set, and the HSM 12 terminates or closes 229 the launched authentication session.

Otherwise, i.e. if the reconstructed secret matches the reference secret, the HSM 12 authenticates 230 successfully the N user set.

The invention solution allows only one user of the L user subset physically present at the authentication device, while the other user(s) of the M user subset may be anywhere but has(have) to be equipped with its (their) respective user device or chip, as a trusted device or chip, that is(are) identified and registered at the authentication device.

The invention solution uses trusted device(s) and/or chip(s) that offer a two factor authentication, namely something that the user has and something that the user knows (so as to release a secret share).

The invention solution allows authenticating, simply, securely and efficiently, based on secret shares that originate from respective associated trusted device(s) and/or chip(s), a set of N users.

Such an N user set authentication invention method may be used notably in a key ceremony process that needs to reconstruct at least a minimum number M of secret shares, among a number of N user roles, to access a requested resource(s).

The invention claimed is:

1. A method for authenticating a set of at least two users to a device, wherein each user of the set of at least two users is associated with a predefined share of a predetermined reference secret, the method comprises:

defining, by the device, a first subset and a second subset of the at least two users, wherein the first subset being comprised within the set of at least two users, and the second subset being comprised within the first subset;

verifying, by the device, whether each user of the second subset does or does not satisfy to be physically proximate to the device and at least one first authentication condition;

requesting, by the device, to each user device relating to each user of the set of at least two users, a secret share, only when each user of the second subset satisfies to be physically proximate to the device and the at least one first authentication condition;

receiving, by the device, from each user device relating to at least each user of the first subset, the secret share;

reconstructing, by the device, for the set of at least two users, a secret by using each received secret share;

verifying, by the device, whether the reconstructed secret does or does not match the reference secret; and authenticating, by the device, the set of at least two users, only when the reconstructed secret matches the reference secret.

2. The method according to claim 1, wherein the at least one first authentication condition includes at least one element of the following group:

a user device or chip for each user of the second subset has to be previously registered at the device;

at least one predefined communication protocol for each user of the second subset has to be used for accessing the device;

a predefined secret share for each user of the second subset has to be bound to a corresponding user device or chip;

a user device, for each user of the second subset, has to securely retrieve, from a coupled hardware secure element, the associated secret share; and at least one previous successful user authentication has to be carried out by or through the user device for each user of the second subset.

3. The method according to claim 1, wherein, a user of the second subset being associated with a single user device, the user device being close to the device, wherein the user device, as a proxy, sends, to each user device of another user of the set of at least two users, a request for getting an associated secret share while possibly further requiring, from each other user, to satisfy at least one predetermined second authentication condition, wherein at least each user device relating to another user of at least the first subset sends, through the proxy, to the device, all of the at least one received secret share.

4. The method according to claim 3, wherein the device verifies, based on received data, whether at least one user of the second subset does or does not satisfy at least one predetermined authentication condition that includes at least one element included in the following group:

for at least one identified user device to be addressed by the proxy, a request for encrypting the associated secret share;

for at least one identified user device to be addressed by the proxy, a request for signing the associated secret share;

for at least one identified user device to be addressed by the proxy, a request for sending, through a single device, as a proxy, the associated secret share;

the single user device relating to the second subset has to be used, as a proxy, for exchanging with the device;

the proxy has to exchange with each other user of at least the first subset, as an interlocutor user, by using a live communication between the proxy user and the interlocutor user;

the proxy user has to identify each other user of at least the first subset, as an interlocutor user; and the proxy user has to authenticate each other user of at least the first subset, as an interlocutor user.

5. The method according to claim 3, wherein each user device of another user of at least the first subset encrypts the retrieved secret share by using a key shared with the device, the key being derived from the secret share associated with the concerned user, the concerned user device sends, through the proxy, to the device, the thus encrypted secret share.

6. The method according to claim 1, wherein the device registers at least one identifier relating to the user device or chip relating to each user of at least the first subset.

7. A chip for authenticating a set of at least two users, wherein each user of the set of at least two users is associated with a predefined share of a predetermined reference secret, the chip comprising;
a physical processor configured to:
define a first subset and a second subset of the at least two users, wherein the first subset being comprised within the set of at least two users, and the second subset being comprised within the first subset;
verify whether each user of the second subset does or does not satisfy to be physically proximate to the device and at least one first authentication condition;
request, to each user device from each of the set of at least two users, a secret share, only when each user of the second subset satisfies to be physically proximate to the device and the at least one first authentication condition;
receive, from each user device relating to at least each user of the first subset, the secret share;
reconstruct, for the set of at least two users, a secret by using each received secret share;
verify whether the reconstructed secret does or does not match the reference secret; and
authenticate the set of at least two users only when the reconstructed secret matches the reference secret.

8. A first system for authenticating a set of at least two users, wherein, the first system comprises:
a device; and
at least one chip;
wherein the device being connected or communicatively coupled to the at least one chip,
wherein the at least one chip comprising a physical processor configured to:
define a first subset and a second subset of the at least two users, wherein the first subset being comprised within the set of at least two users, and the second subset being comprised within the first subset;
verify whether each user of the second subset does or does not satisfy to be physically proximate to the device and at least one first authentication condition;
request, to each user device from each user of the set of at least two users, a secret share, only when each user of the second subset satisfies to be physically proximate to the device and the at least one first authentication condition;
receive, from each user device relating to at least each user of the first subset, the secret share;
reconstruct, for the set of at least two users, a secret by using each received secret share;
verify whether the reconstructed secret does or does not match a reference secret; and
authenticate the set of at least two users only when the reconstructed secret matches the reference secret.

9. A device for authenticating a set of at least two users, wherein each user of the set of at least two users is associated with a predefined share of a predetermined reference secret, the device comprising:
a physical processor configured to:
define a first subset and a second subset of the at least two users, wherein the first subset being comprised within the set of at least two users, and the second subset being comprised within the first subset;
verify whether each user of the second subset does or does not satisfy to be physically proximate to the device and at least one first authentication condition;
request, to each user device from each user of the set of at least two users, a secret share, only when each user of the second subset satisfies to be physically proximate to the device and the at least one first authentication condition;
receive, from each user device relating to at least each user of the first subset, the secret share;
reconstruct, for the set of at least two users, a secret by using each received secret share;
verify whether the reconstructed secret does or does not match the reference secret; and
authenticate the set of at least two users only when the reconstructed secret matches the reference secret.

10. A second system for authenticating a set of at least two users, wherein, the second system comprises:
at least one device; and
at least one server;
wherein the at least one server being connected to the at least one device,
wherein the at least one device comprising a physical processor configured to:
define a first subset and a second subset of the at least two users, wherein the first subset being comprised within the set of at least two users, and the second subset being comprised within the first subset;
verify whether each user of the second subset does or does not satisfy to be physically proximate to the device and at least one first authentication condition;
request, to each user device from each user of the set of at least two users, a secret share, only when each user of the second subset satisfies to be physically proximate to the device and the at least one first authentication condition;
receive, from each user device relating to at least each user of the first subset, the secret share;
reconstruct, for the set of at least two users, a secret by using each received secret share;
verify whether the reconstructed secret does or does not match a reference secret; and
authenticate the set of at least two users only when the reconstructed secret matches the reference secret.

* * * * *